United States Patent [19]

Oliveira

[11] 4,452,841

[45] Jun. 5, 1984

[54] UNSUPPORTED SHAPED SOUND BARRIER COMPONENT

[75] Inventor: Paul E. Oliveira, New Bedford, Mass.

[73] Assignee: The Goodyear Tire & Rubber Company, Akron, Ohio

[21] Appl. No.: 451,112

[22] Filed: Dec. 20, 1982

[51] Int. Cl.[3] .......... B32B 7/00

[52] U.S. Cl. .......... 428/174; 428/131; 428/187; 428/220; 181/294; 524/423; 524/432; 524/586

[58] Field of Search .......... 181/294; 428/220, 187, 428/323, 131, 174; 524/423, 586, 432

[56] References Cited

U.S. PATENT DOCUMENTS

| | | | |
|---|---|---|---|
| 2,480,008 | 8/1949 | Anderson | 524/434 |
| 3,639,529 | 2/1972 | Mackenzie, Jr. | 524/434 |
| 4,303,723 | 12/1981 | Oliveira | 428/247 |

FOREIGN PATENT DOCUMENTS

| | | | |
|---|---|---|---|
| 55-118940 | 9/1980 | Japan | 524/423 |

OTHER PUBLICATIONS

Katz & Milewski, Handbook of Fillers and Reinforcements for Plastics, 1978, pp. 59–65.

*Primary Examiner*—Marion McCamish
*Assistant Examiner*—P. R. Schwartz
*Attorney, Agent, or Firm*—J. D. Wolfe; R. D. Thompson

[57] ABSTRACT

A shaped sound barrier component comprising a thermoplastic member highly loaded with barium sulfate (more than 200 to about 400 parts) and zinc oxide (1 to 500 parts). Preferably the thermoplastic contains 20 to 50 parts of chopped fibers per 100 parts of said thermoplastic although larger amounts can be used, for instance a 100 parts where the usage is severe.

5 Claims, 3 Drawing Figures

UNSUPPORTED SHAPED SOUND BARRIER COMPONENT

TECHNICAL FIELD

Figure 1:
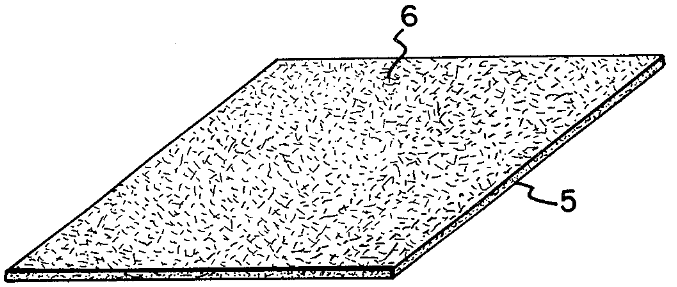

This invention relates to a shaped sound barrier component that can be assembled to reduce the noise transmitted from a noise maker such as machinery, pumps and related apparatus, trains or vehicles. More particularly this invention relates to a shaped, highly barium sulfate and zinc oxide loaded thermoplastic member having the shape to enclose parts of a noise emitter or to fit or interposed in a noise reducing relationship.

BACKGROUND ART

Noisy equipment and apparatus are known to impair the hearing of those who remain subjected to the noise for a long time. Consequently efforts to reduce noise levels by erecting noise barriers is widespread. These noise barriers include rigid panels of wood, metal and concrete erected along highways and train tracks to relatively flexible, light sheets or mats such as those described in Paul Edward Oliveira's U.S. Pat. No. 4,110,510 issued Aug. 29, 1978. U.S. Pat. No. 4,10,510 provides a barrier in the language of the abstract as follows:

"A sound barrier material comprised of a polyvinyl chloride impregnated mesh sheet having a coating of about 0.002 to 3.2 inch gauge of a barium sulfate loaded chlorinated polyethylene laminated to a foam of 1.5 to 2.5 pounds per cubic foot."

It is obvious the above described prior art sound barrier materials require large amounts of labor to install the barrier as each panel is shaped or made on the job site, usually with the use of the most costly labor to cut, shape and install the sound barrier.

DISCLOSURE AND PRACTICE OF THE INVENTION

I have discovered that thermoplastics loaded with over 200 parts per 100 of barium sulfate shaped and at least partially cured to reduce the thermoplasticity of the plastic yields an effective sound barrier component and thus eliminates the costly conventional cut and fit operations associated with the prior art flexible sheet barrier materials. These shaped barrier components can be readily assembled to enclose noisy machinery and related apparatus to reduce the noise transmitted.

The highly loaded barium sulfate thermoplastic can be extruded or calendered into sheets, or mats. These sheets or mats are cut in the desired size, viz panel, for the noise component to be formed.

These panels are shaped by pressing in the conventional stamping press, rotary press or vacuum forming with the pressure and heat being maintained for sufficient time to at least set and preferably partially cure the thermoplastic so the shaped panel will retain its shape in service under the range of temperatures to which it is exposed. Preferably the shaped panel has predrilled or molded holes to facilitate attachment of the shaped panels in the noise abatement position on or around the machinery or apparatus emitting the noise alternatively the shaped panels can be clamped or otherwise attached.

A further advantage of using shaped panels is that the panels can be shaped with embossing or other decorative design to aid in creating a more desirable aesthetic appearance in finished assembly of the noise abating panels. Where the panels are extremely large or subjected to significant vibrations it is preferred to incorporate chopped fibers, viz ⅛ to ⅜ inch (0.32 to 0.96 cm) up to several inches in length, such as the representative cellulosic or modified cellulosic ones, polyamide and polyester in the thermoplastic composition to increase the modulus and resistance to growth of the panel in the installed position. In extreme cases scrim, wire and light metal sheets may be molded or laminated to the thermoplastic sheet and thus the panels are shaped, preferably during the molding step.

Figure 2:
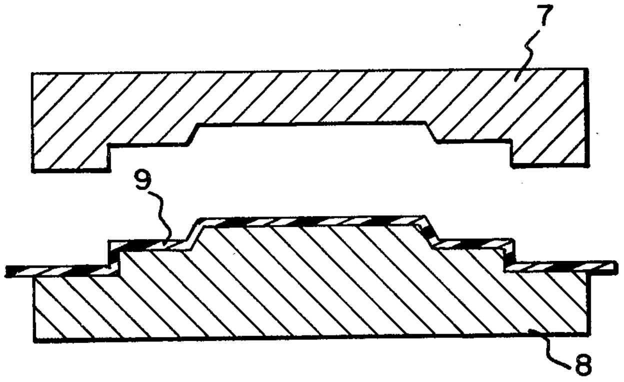
Figure 3:
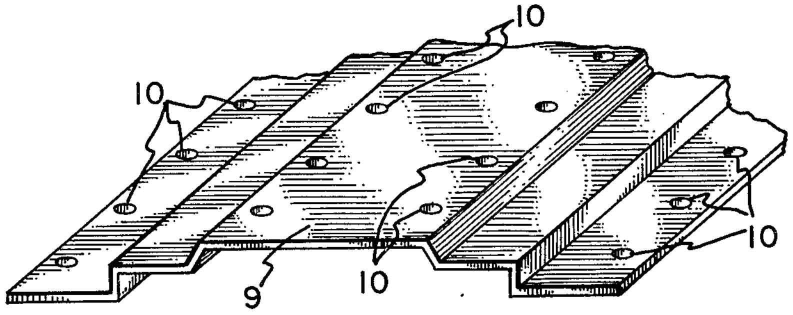

The nature of this invention can be understood and appreciated more readily by reference to the drawings where FIG. 1 is a perspective view of a panel of loaded thermoplastic containing fiber loading;

FIG. 2 is a side elevational view of an open mold showing the shaped panel; and FIG. 3 is a perspective view of one embodiment of this invention.

Referring more specifically to FIG. 1 the numeral 5 indicates an essentially rectangular panel containing chopped fibers 6 dispersed therein essentially randomly except for orientation effected by sheeting the loaded thermoplastic.

Now referring to FIGS. 2 and 3 the panel 5 has been placed in a two part mold having a top part 7 and a bottom part 8 mold halves are closed the panel is deformed to form the shaped panel 9.

It is preferred that the sheet from which the panels are cut has a gauge of 0.003 to 0.500 inch (0.0076 to 1.72 centimeters) and a weight range of 0.32 to 76.03 pounds per square yard (0.017 to 41.21 kilograms per square meter) as this has been found to be a suitable barrier reducing thickness and weight.

The thermoplastics used to form the shaped panel can be any of those well known for their thermoplasticity. Representative members are the styrene block copolymers such as the acrylonitrile and the butadiene copolymers of styrene, olefinic thermoplastic elastomers such as terpolymers of polypropylene oxide with the monomers such as styrene and butadiene or isoprene, polyvinyl chloride and the thermoplastic copolyesters. Chlorinated polyethylene is particularly preferred as it is relatively burn resistant and is relatively resistant to corrosive vapors.

The loading of barium sulfate in these thermoplastics is extremely high, being at least greater than 200 parts per hundred up to 400 parts, with the preferred range being 230 to 350 parts. This high loading gives satisfactory sound absorption without the need to use a foam member or other backing material as the shaped panel retains its shape in service.

The curative agent or agents used to achieve at least a partial cure depends on the specific thermoplastic being used, but it is desirable to use significant amounts of zinc oxide in conjunction with the curative. Where the thermoplastic contains significant amounts of the halogens, such as chlorine, it is advantageous to use about 2 to 5 parts of magnesium oxide, too, as the curative with the zinc oxide. In fact, use of 1 to 500 parts of zinc oxide may be used to aid the curing and to aid the barium sulfate in reducing sound transmission.

With the ethylenically unsaturated thermoplastic the usual sulfur curatives alone or in conjunction with the well known sulfur type accelerators may be used.

The specific nature of this invention and its advantages can be more readily appreciated by reference to the following representative and exemplary examples wherein all parts and percentages are by weight unless otherwise designated.

EXAMPLE 1

One hundred parts of chlorinated polyethylene containing 36 to 48 percent chlorine was mixed on the mill with 300 parts of barium sulfate, 10 parts of zinc oxide, 5 parts of magnesium oxide, 5 parts of a stabilizer of the alkaline earth soap type and 40 parts of plasticizer and 5 parts of pigment, a carbon black and then calendered into a sheet about 0.40 inch thick. The sheet was cut into panels and the panels were molded to fit around a large pipe to form a shaped sound barrier element which functioned effectively to reduce the nose emitted by the pipe.

In another embodiment 20 to 50 parts of chopped cellulosic fiber was incorporated in the sheet recipe above and formed into a sheet. Panels were cut from the sheet and shaped on a vacuum former into a shaped sound barrier component. This component had mounting holes 10 drilled therein. This panel offered greater resistance to deformation than a panel without chopped fiber loading in the unsupported position.

While certain representative embodiments and details have been shown for the purpose of illustrating the invention it will be apparent to those skilled in this art that various changes and modifications may be made therein without departing from the spirit or scope of the invention.

I claim:

1. An unsupported shaped sound barrier component having a thickness of 0.0076 to 1.72 centimeters consisting essentially of on a weight basis 100 parts of a thermoplastic loaded with more than 200 parts up to about 400 parts of barium sulfate and 1 to 500 parts of zinc oxide per 100 of thermoplastic, said component being at least partially cured.

2. The sound barrier component of claim 1 wherein the thermoplastic is a chlorinated polyethylene.

3. The component of claim 1 wherein the component has a design pressed into its surface.

4. The component of claim 1 having incorporated in the thermoplastic chopped fibers from 0.32 to several centimeters.

5. The component of claim 4 wherein about 20 to about 50 parts of chopped fibers per 100 parts of thermoplastic is used.

* * * * *